C. R. RAWDON & J. H. HEITMANN.
INNER TUBE FOR PNEUMATIC TIRES.
APPLICATION FILED OCT. 1, 1917.

1,279,001. Patented Sept. 17, 1918.

WITNESSES:
Harry A. Bennett
C. H. Callon

INVENTORS.
Charles R. Rawdon
John H. Heitmann
BY Emil Starek
ATTORNEY.

UNITED STATES PATENT OFFICE.

CHARLES R. RAWDON AND JOHN H. HEITMANN, OF ST. LOUIS, MISSOURI.

INNER TUBE FOR PNEUMATIC TIRES.

1,279,001.   Specification of Letters Patent.   Patented Sept. 17, 1918.

Application filed October 1, 1917.   Serial No. 194,187.

*To all whom it may concern:*

Be it known that we, CHARLES R. RAWDON and JOHN H. HEITMANN, citizens of the United States, residing at St. Louis, State of Missouri, have invented certain new and useful Improvements in Inner Tubes for Pneumatic Tires, of which the following is a full, clear, and exact description, reference being had to the accompanying drawings, forming a part hereof.

The present improvement is particularly directed to the construction of the inner tube of pneumatic tires, and has for its object to provide an inflatable tube which shall be practically puncture-proof; one whose walls are susceptible of readily yielding when forced inwardly by sharp objects such as nails, tacks, and the like which have penetrated the outer casing, such yielding being permitted by reason of the fact that certain layers entering the construction of the tube are disconnected from adjacent layers disposed exteriorly thereto, the inner layers being preferably protected by a distinct layer not readily penetrable by nails, tacks, and the like. In the present embodiment of our invention the dilatable rubber membrane of the tube is confined to a predetermined portion of the cross-section of the tube, said portion lying adjacent the metal rim of the wheel, with which it is kept from coming in direct contact by a suitable flap of canvas, or duck, or equivalent material covering said dilatable membrane and interposed between it and the felly rim aforesaid. Our improved inner tube possesses decided advantages which will be fully apparent from the following detailed description in connection with the accompanying drawing in which—

Figure 1:
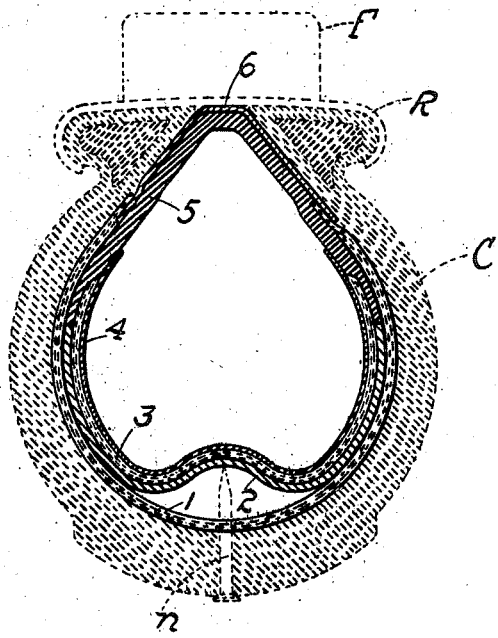
Figure 2:
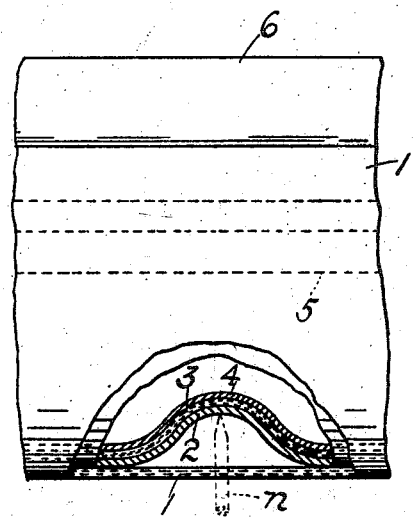
Figure 3:
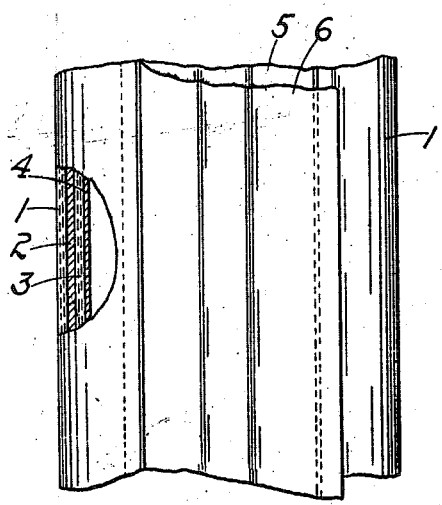

Figure 1 represents a cross-section of an inflated pneumatic tire with our invention applied thereto, the outer casing of the tire, the wheel-rim and felly being shown dotted; Fig. 2 is a side elevation of the inflatable tube with parts broken away; and Fig. 3 is an inner edge view of the inflatable tube, that is to say, looking radially outward from the axis of the tire or of the wheel on which the same is mounted, parts being broken away.

Referring to the drawings, F represents the felly, and R, the rim of the wheel to which the outer casing C of the tire is secured. These features being old the same are shown dotted, the present invention being concerned solely with the inner inflatable tube. Said inner tube is composed of a dilatable section facing the rim of the wheel, and a non-dilatable section facing the tread of the tire. The non-dilatable section in the present embodiment of our invention is composed of an outer layer 1 of woven fabric such as duck, canvas, silk and the like, which may be of single or multiple ply. Interiorly of said layer 1 and loose therefrom is disposed a non-puncturable yielding, pliable layer 2 preferably of chrome leather, the said layer 2 being cemented to an inner layer 3 of woven fabric on the order of the layer 1, the sides of the layer 3 overlapping or projecting beyond the sides of the layer 2, and the sides of the layer 1 projecting beyond the side edges of the layer 3. Disposed on the inner face of the layer 3 and adhering thereto is a rubber layer or liner 4 the sides whereof project beyond or overlap the side edges of the layer 3, and being themselves overlapped by the sides of the layer 1. The dilatable section or that facing the rim of the wheel comprises a comparatively thick sheet or layer of rubber 5 on the order usually employed for the conventional inner inflatable tube, said layer being prevented from coming in direct contact with (and undesirable adhesion to) the metal surface of the rim R by a woven fabric flap or sheet 6 loose from the rubber layer 5, the side edges of said flap being cemented or otherwise secured to the adjacent side edges of the sheet or layer 1, the united edges of the respective sheets being overlapped substantially as shown in the drawings (Fig. 1).

The layer 2 being loose from the layer 1 and being itself practically non-puncturable by the ordinary tack or nail, it follows that when such a nail $n$ penetrates the outer casing C and the outer layer 1 of the non-dilatable section of the inner tube, the point of the nail will simply force the layer 2 and subsequent layers inwardly (Fig. 1) without injury to said layers, the layer 2 being loose from the outer layer 1 readily separating from said outer layer under the circumstances referred to.

In the present embodiment of our invention (to the specific details of which we need not necessarily adhere) the side edges of the dilatable elastic member or sheet 5 are placed in abutting relation to the corresponding edges of the layer 2, the thickness of the sides of said sheet 5 being somewhat reduced adjacent the edges so as to bring the inner face of the layer 3 substantially flush with the inner face of the sheet 5 when the parts are united, thereby forming a smooth and continuous surface for the support and disposition of the inner rubber layer 4. The thin portions of the sides of the sheet 5 are thus confined between the layers 1 and 3, the thicker portions being confined between the layers 1 and 4, the parts being vulcanized and caused to thoroughly adhere to one another. The layer 4 of course must be of rubber or equivalent non-porous air tight material, serving as it does as a complementary layer to the dilatable air-tight sheet 5 for confining the air when the tube is inflated. The layer 2 need not necessarily be of chrome leather though in practice we find this material eminently desirable, being pliable, yielding, and soft. We could however substitute any equivalent and preferably non-woven material capable of resisting punctures by nails, tacks, glass, and the like, without departing from the nature or spirit of our invention.

By making the inner tube of two sections, namely a dilatable section and a non-dilatable puncture proof section, the latter being on the side of the tread portion of the tire, we avoid puncturing the rubber sheet or member constituting the dilatable section, thereby insuring a long life for the inflatable tube. Obviously, the dilatable member 5 can not be punctured being located adjacent the rim of the wheel, so that necessarily the non-dilatable section which is adjacent the tread of the tire must be made puncture-proof. This we have accomplished by the disposition of the several layers 1, 2, 3, 4, as described, it being understood that any equivalent thereof is contemplated by the present invention. Obviously too, we do not wish to be restricted to the precise arrangement of building up the several layers, nor to the specific manner of connecting or molding the dilatable member to the non-dilatable section of the tube.

Having described our invention what we claim is:

1. In an inner tube for pneumatic tires, a non-dilatable section adjacent the tread of the tire comprising an outer layer of fabric, an inner layer of fabric, and an intermediate pliable non-puncturable layer, and a dilatable section connected to the fabric layers.

2. In an inner tube for pneumatic tires, a non-dilatable section adjacent the tread of the tire comprising an outer layer of fabric, an inner layer of fabric, and an intermediate pliable non-puncturable layer free from the outer fabric layer, and a dilatable section connected to the fabric layers.

3. In an inner tube for pneumatic tires, a non-dilatable section adjacent the tread of the tire comprising an outer layer of fabric, an inner layer of fabric, and an intermediate non-puncturable layer, and a dilatable section connected to the non-dilatable section and facing the rim of the wheel supporting the tire.

4. An inner tube for pneumatic tires, comprising a non-dilatable section adjacent the tread of the tire composed of an outer layer of fabric, an inner layer of fabric, and an intermediate pliable non-puncturable layer, a dilatable section adjacent the rim of the wheel, and means on the inner face of the inner fabric layer of the non-dilatable section coöperating with the dilatable section to make the tube air-tight when inflated.

5. An inner tube for pneumatic tires comprising a non-dilatable tread section composed of an outer layer of woven fabric, a layer of leather interior thereto but loose therefrom, a layer of woven fabric interior to the leather layer and adhering thereto, the side edges of the fabric layers extending beyond the side edges of the leather layer, an inner layer or liner of rubber adhering to the last mentioned fabric layer and extending laterally beyond the edges of said fabric layer, a dilatable rubber member adjacent the rim of the wheel having its side edges abutting against the corresponding edges of the leather layer, the inner face of the dilatable member being secured to the inner rubber layer of the non-dilatable tread section, and the opposite faces of the said dilatable member being secured between the lateral extensions of the fabric layers, and a woven fabric flap covering the outer face of the dilatable member but loose therefrom, the sides of the flap being secured to the adjacent sides of the outer fabric layer aforesaid.

6. In an inner tube for pneumatic tires, a non-dilatable tread section comprising an outer woven fabric layer, a non-puncturable layer of non-woven material interior thereto and loose therefrom, a woven fabric layer secured to the inner face of the non-woven layer, and an air-tight liner layer covering the inner face of the last mentioned woven fabric layer.

In testimony whereof we affix our signatures in the presence of two witnesses.

CHARLES R. RAWDON.
JOHN H. HEITMANN.

Witnesses:
  EMIL STAREK,
  C. H. CALLON.